(12) United States Patent
Payne et al.

(10) Patent No.: US 7,285,747 B2
(45) Date of Patent: Oct. 23, 2007

(54) FLUX ASSISTED GAS TUNGSTEN ARC WELDING UTILIZING CONSUMABLE INSERTS FOR ULTRA LOW PROFILE WELDING APPLICATIONS

(75) Inventors: Ronald J. Payne, Forest, VA (US); Stephen M. Lavesque, Lynchburg, VA (US)

(73) Assignee: Atreva NP Inc., Lynchburg, VA (US)

( * ) Notice: Subject to any disclaimer, the term of this patent is extended or adjusted under 35 U.S.C. 154(b) by 217 days.

(21) Appl. No.: 10/941,726

(22) Filed: Sep. 15, 2004

(65) Prior Publication Data
US 2005/0092813 A1  May 5, 2005

(51) Int. Cl.
*B23K 9/02* (2006.01)

(52) U.S. Cl. .................................. 219/145.31; 219/61

(58) Field of Classification Search ................ 219/61, 219/137 WM, 146.311, 145.31; 228/246
See application file for complete search history.

(56) References Cited

U.S. PATENT DOCUMENTS

| | | | | |
|---|---|---|---|---|
| 1,332,184 A | * | 2/1920 | Adams, Jr. .................. | 219/61 |
| 3,033,145 A | * | 5/1962 | Thielsch ..................... | 228/246 |
| 3,227,849 A | * | 1/1966 | Thielsch ..................... | 219/61 |
| 6,707,005 B1 | * | 3/2004 | Johnson et al. ........ | 219/146.31 |
| 6,884,963 B1 | * | 4/2005 | Ames et al. ........ | 219/137 WM |

* cited by examiner

*Primary Examiner*—Clifford C. Shaw
(74) *Attorney, Agent, or Firm*—Vytas R. Matas

(57) ABSTRACT

A speedy method of welding in a tight space using a single pass is provided using a technique which involves the use of a particularly shaped, flux treated consumable insert to provide deep weld penetration by a GTAW machine which is compact and fits the narrow spaces found in applications such as feeder tube repair since it does not require an insert wire flux feed system and is thus capable of negotiating narrow spaces found in feeder tubes.

7 Claims, 5 Drawing Sheets

FLUX ASSISTED GAS TUNGSTEN ARC WELDING UTILIZING CONSUMABLE INSERTS FOR ULTRA LOW PROFILE WELDING APPLICATIONS

BACKGROUND OF THE INVENTION

1. Field of the Invention

The present invention is generally drawn to the repair of boiler elements by welding and more particularly to tube section replacement using arc welding.

2. Description of the Prior Art

The conditions of energy production have changed over the years since the first nuclear reactors were put into service (especially in the United States). Many nuclear power plants are approaching the end of their design life and the licensed operators of these plants are seeking to extend the life of the plants (and plant components). Many of these components were not designed with concerns of replacement and repair, and some components have been subjected to unforeseen necessity for repair due to material degradation. As the demand for these repairs has risen, new technologies to address these repairs have developed.

For this technology to become reality, an all encompassing approach of low profile welding machine design and process development needs to be addressed to include welding various material types and dissimilar metal welding joints, so that the end product is capable of performing in a wide variety of applications. Enabling technologies for this process include:

Development of robust welding procedures with increased penetration capabilities;

Ability to weld various material types;

Elimination of wire feeding mechanism for compact tool design.

The application for this technology will be varied within the power generation industry. Any application that has tight tolerances on the radial clearance between tubes would be applicable. One example of this would be the boilers of fossil fuel plants, where tubing with limited tube to tube radial clearance require maintenance. Another application would the feeder tubes on CANDU reactors.

CANDU reactors are plagued by an unforeseen problem that has arisen in the feeder tubes of the reactor. Flow assisted corrosion (FAC) on the feeder tubes is forcing wholesale replacement or remediation/mitigation strategies to be developed for the feeder tubes. Feeder tube design imposes stringent welding requirements (i.e.0.000"-0.030" maximum root penetration) on the repair/replacement approaches. In addition to stringent penetration requirements, the feeder tube location and geometry presents challenges for tooling design. CANDU feeder tubes have an extremely compact arrangement with an outside diameter of inches. FIG. 1 and FIG. 2 illustrate the layout of feeder tubes within a CANDU reactor.

Known technologies for such applications include the high energy density welding processes that offer the ability to achieve high penetration capabilities through a keyhole welding process. The keyhole process is generally not preferable for orbital applications because parameter development (i.e. ramp up and ramp down) is difficult for proper closure of the keyhole at the end of the welding process. These processes also require high capital equipment expenditures and additional process training due to the fact that the majority of the welding workforce is not familiar with these processes.

Gas Tungsten Arc Welding (GTAW) is an arc welding process that utilizes a non-consumable Tungsten electrode along with an inert shielding gas to provide a molten weld pool that produces a weld deposit of high quality. High quality weld deposits and relatively low cost equipment have made GTAW an indispensable tool in many industries.

As with any process, GTAW has limitations including low deposition rates (slow production rates) and limited penetration capabilities. At material thicknesses greater than 3 mm, penetration capabilities of the process become questionable. Given a tube-to-tube welding operation with a material thickness greater than 3 mm, the weld prep would change to require a multipass welding procedure. Typically the weld joint chosen for an application that can only be welded from a single side (i.e. the tube OD) would be a single-V groove. The single-V groove geometry would be dictated by the number of welding passes required to fill the joint with an appropriate size weld deposit and the design of the equipment for filing that groove. Increased penetration would create efficiency in both process time and set-up time. As the penetration capabilities increase, the requirements for multipass welding decrease. For example, if the GTAW process can penetrate 3/16" material and provide sufficient backing during the welding process, the total arc time could possibly be cut by 1/3 due to the fact that general welding procedures would require a 3-pass weld procedure at this material thickness. Real time savings would not be realized by the welding time alone. With increased penetration, the weld prep can be changed from the single-V prep, which requires a machining operation, to a square groove weld.

GTAW can be utilized with or without filler material, however, welding on steels that have not been fully deoxidized (i.e. rimmed steels) can cause porosity problems, which can be mitigated utilizing filler materials that contain deoxidizers. Filler metals also provide additional material that is needed for weld reinforcement, both ID and OD, when required by the design specifications.

GTAW filler materials are specified in such a manner so that its composition contains elements that assist during the welding process by imparting specific mechanical properties to the weld deposit or by assuming that the weld deposit remains clean. This is especially beneficial when welding materials that have been processed in a manner that is not friendly to welding (i.e. dirty steels). Generally, filler materials are added to the GTAW process in one of two states, filler wire or consumable insert.

Filler wire is deposited into the GTA weld pool via a spool of wire that is fed into the arc from a wire spool through a length of conduit and a wire feeding mechanism. For this process to work correctly, the wire has to be placed in the vicinity of the weld pool near the arc to properly melt the wire in the molten weld pool. Such techniques make for a large weld apparatus which does not readily fit narrow spaces such as CANDU reactor feeder tubes.

Consumable inserts act as pre-placed filler material. Consumable inserts are offered in a wide variety of shapes, sizes and material compositions. Known suppliers of such inserts include Arcos, ITT Grinnel, Weldring, and Robvon Inserts. FIG. 5 shows five various shapes of consumable inserts that are currently manufactured in ribbon form including a rectangle, a T-shape, a Y shape, a rounded pin shape and a ½ pin shape. These inserts are intended for filler in V or square groove welding applications and would not be usefull in abutting tube joining as is done in the CANDU filler tube replacement.

The GTAW process is limited to melting the consumable insert in much the same way it is limited to melting the base material. The consumable insert size will be limited to the penetration capability of the process. If the penetration capability of the process can be increased, then the size of the consumable insert can be increased. The consumable insert is designed to mate to a corresponding material thickness. Increased penetration capability increases the design envelope for the consumable insert, which increases the compatibility of material thicknesses for that type of consumable insert.

Penetration fluxes are used to increase weld penetration. These fluxes are oxides applied to the surface of the material to be welded that provide an increased ability for the process to penetrate the material. The primary benefits of using flux derive from its ability to increase autogenous GTA weld penetration-to-width ratio by a factor of 2 to 3. This significantly reduces welding times and simplifies weld joint preparation, making it possible to use a square butt joint where a groove prep was previously required. Weld distortion is also reduced due to a more symmetrical weld cross section. Flux is relatively inexpensive and easy to use; therefore, the costs for implementation are nominal. FIG. 4 exhibits the effects that the GTAW penetration flux can have on the autogenous GTAW process. Note that the weld cross section transforms from a partial penetration weld, located on the left-hand side of the pipe shown in the photograph, to a fully penetrated weld on the right-hand side of the pipe shown in the photograph. However, todate fluxes have not been directly applied to consumable inserts prior to welding but were added by a wire feeder of the flux. Thus to provide an efficient fast weld in a space restricted area a process using GTAW in combination with a suitable consumable insert and the use of flux was needed to provide the penetration capabilities required by the design of the joint and the appropriate material properties (imparted by the material composition of the filler material) for a fully functional welding design.

SUMMARY OF THE INVENTION

The present invention solves the problems associated with prior art repair techniques as well as others by providing a speedy method of welding thick section piping in a tight space using a single pass. The technique involves the use of a flux treated consumable insert to provide deep weld penetration by a GTAW machine, which is also compact and fits the narrow spaces found in feeder piping since it does not require a wire feed system and is thus capable of negotiating narrow spaces found in feeder piping for external arc welding.

In an application for replacing parts of a degraded feeder tube in a reactor, the degraded tube section is cut and a new replacement tube is positioned therein. The replacement tube is manufactured from a photogrametricaly obtained 3-D representation of the defective tube section. A T-shaped circular consumable insert is fitted against the remaining tube and the replacement tube is then fitted to the same insertable insert with the top section thereof overlapping the two tubes. The insert is treated with a flux material to eliminate a flux feeder and the two tubes are then welded together from the outside of the tubes using a GTAW along the top of the insert.

The consumable insert is flux treated by dissolving a powder form flux material in an alcohol solution and painting or spraying the insert therewith. A layer of untreated consumable material may be glued to the top surface of the treated consumable to prevent the flux from being scratched or rubbed there from.

In view of the foregoing it will be seen that one aspect of the present invention is to provide a uniquely shaped consumable material having a flux material already contained therein.

Another aspect is to provide a quick one pass GTAW weld techneque for a new replacement feeder tube section to the remaining section for a nuclear reactor using abuting tubes joined by a consumable insert.

Yet another aspect is to provide a welding technique for narrow limited spaces using a flux treated consumable insert.

These and other aspects of the present invention will be more fully understood upon a review of the following description of the preferred embodiment when considered in conjunction with the drawings.

DESCRIPTION OF THE PREFERRED EMBODIMENT

The solution to welding tubes with tight spatial tolerances with high repeatability rates while avoiding collateral tube removal requires an ultra low profile weld head design that utilizes flux assisted GTAW with a consumable insert. The elimination of a wire feeding mechanism is enabled by the use of a consumable insert. The consumable insert also offers all the benefits that welding wire imposes to the welding process such as the addition of alloying elements to impact beneficial material properties to the weld joint. The final enabler is the penetration flux, which is applied as part of or to the consumable insert. With increased penetration capabilities the GTAW process becomes attractive for thicker wall section tubing, setup times decrease because a square groove butt joint can be employed, yet simplicity of the entire process can be maintained. To the welding operator, the process would remain much the same, therefore training would be minimal and implementation would be swift.

Figure 1:
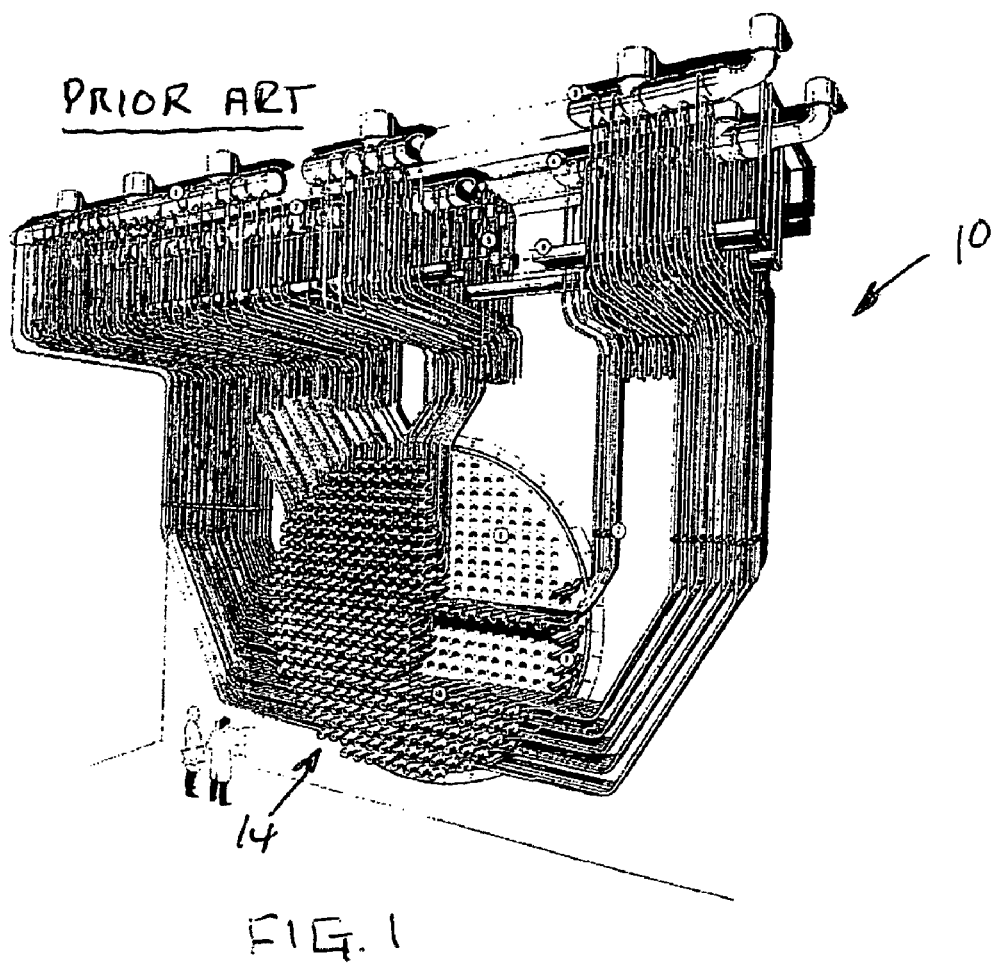
FIG. 1 is a schematic of a CANDU reactor.
Figure 2:
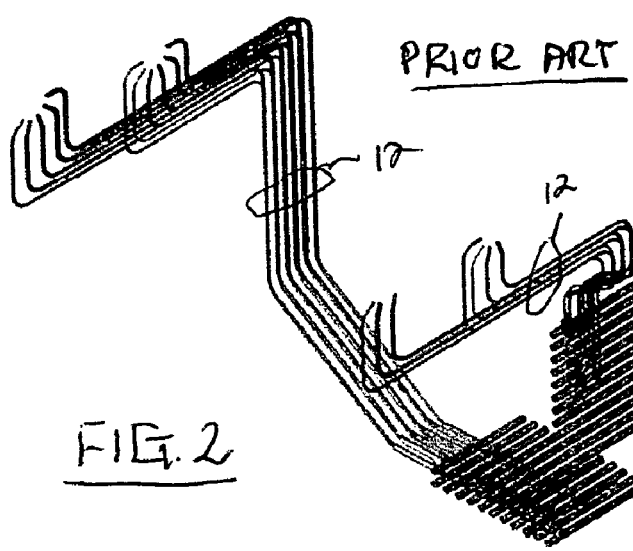
FIG. 2 is a schematic of the feeder tubes of the FIG. 1 reactor.
Figure 3:
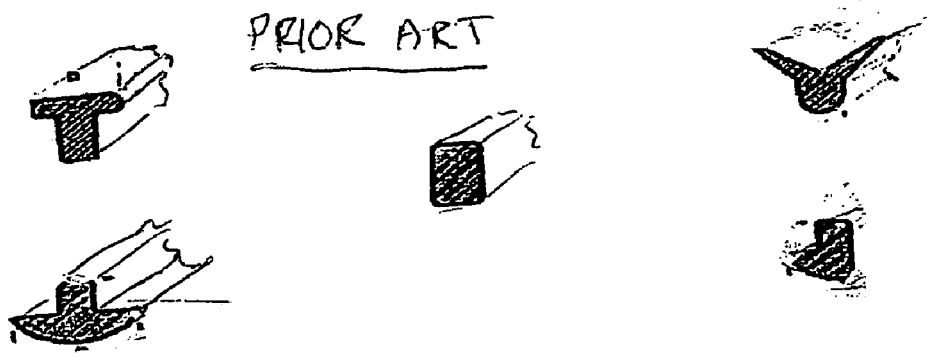
FIG. 3 is a showing of various known shapes of combustible inserts.
Figure 4:
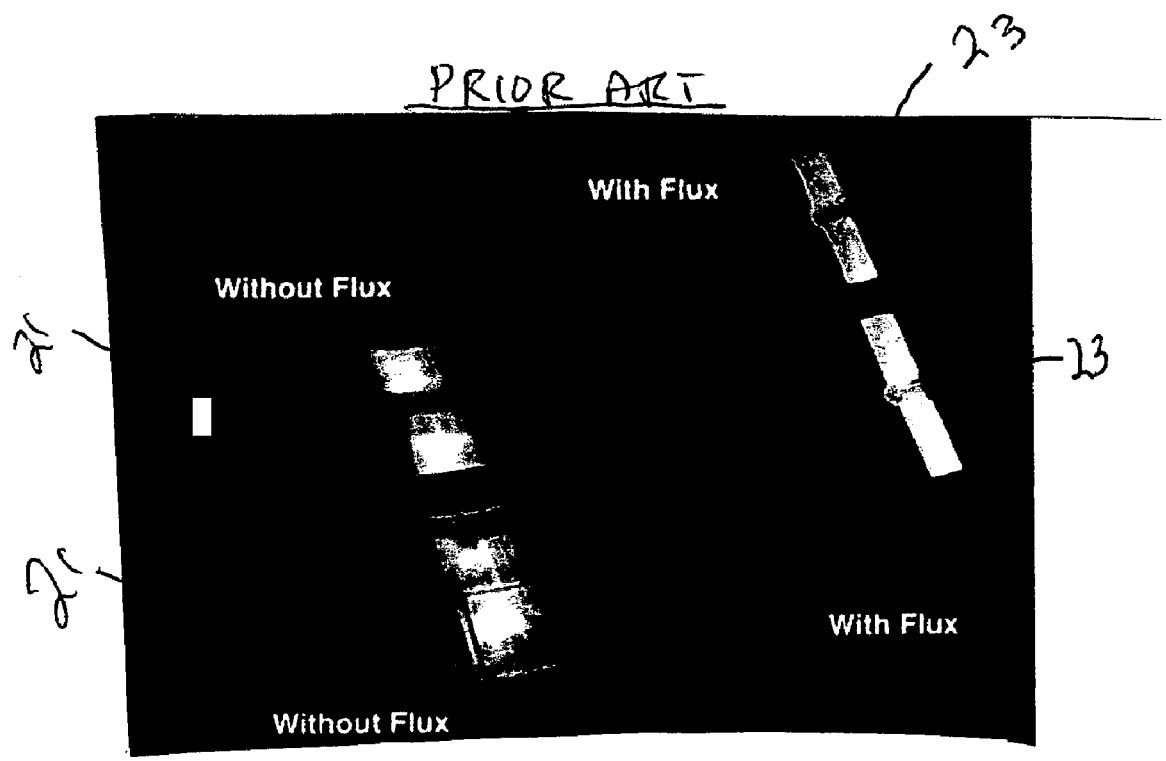
FIG. 4 is a showing of an GTAW weld of a tube section comparing welds made with and without a flux material; from left to right the figure shows a partial penetration weld which becomes full penetration with the addition of a flux material.

To provide a weld in an environment such as the CANDU reactor (10) feeder tube (12) the CANDU reactor is a Canadian design heavy water reactor well known in Canada illustrated in FIG. 1, a weld head is used which is simple, miniaturized, and provides design features that allow welding without collateral tub removal. Such known weld heads have the ability to produce a weld bead on a tubular member while occupying minimal space around the tube. To date, weld heads that have been designed to operate within tight spaces have only been able to penetrate thin wall tubing.

During the reactor outage period for service/replacement of the reactor calandra fuel feed tubes (14) the feeder tubes (12) are checked for flow corrosion using known testing techniques. The detected defective section of the feeder tube (12) is then measured using photometric techniques to provide a three dimensional representation of the defective portion with any bends and angles noted. A new replacement tube section (16) is then manufactured and the defective section is cut out leaving the remaining pipe section (18) of one of the feeder tubes (12), which is not defective.

Figure 5:
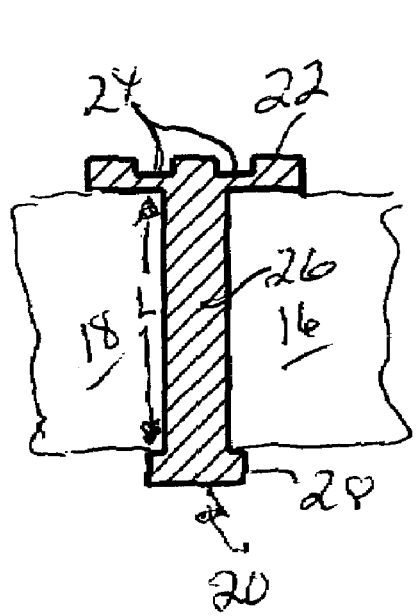
FIG. 5 is a side view of the combustible insert of the present invention used in arc welding reactor feeder tubes.
Figure 6:
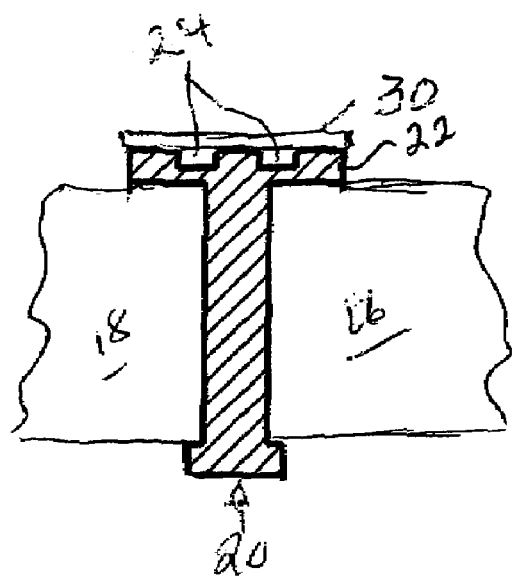
FIG. 6 is a side view of a modified combustible insert of the FIG. 5 insert having a flux layer traped therein.
Figure 7:
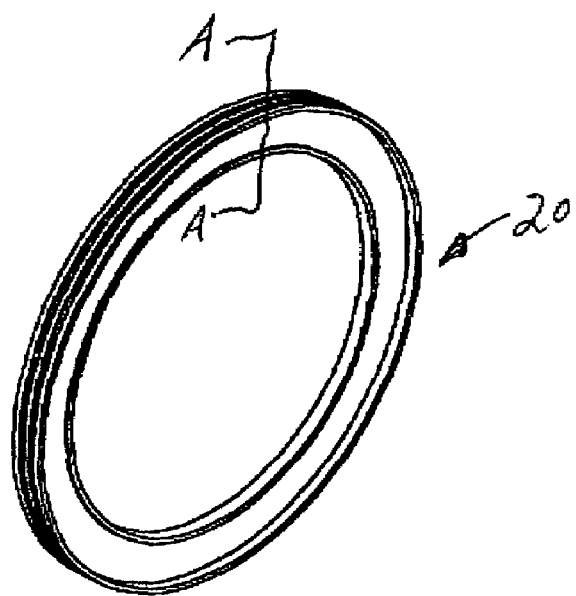
FIG. 7 is an isometric view of the FIG. 5 combustible insert.

A T-shaped combustible insert (20) as best seen in FIGS. 5-7 is used to fit against the remaining pipe (18) at one end and the new replacement tube (16) is fitted against the other end of insert (20). Prior to this insertion, the insert (20) is coated with a flux. Since the flux is usually a powder, the powder is first mixed in an alcohol solution to liquefy the flux and make it easy to apply by either spraying or painting on to the insert (20). The solution may also include an adhesive so that when the flux solution dries it will not flake off from the combustible insert (20).

Figure 8:
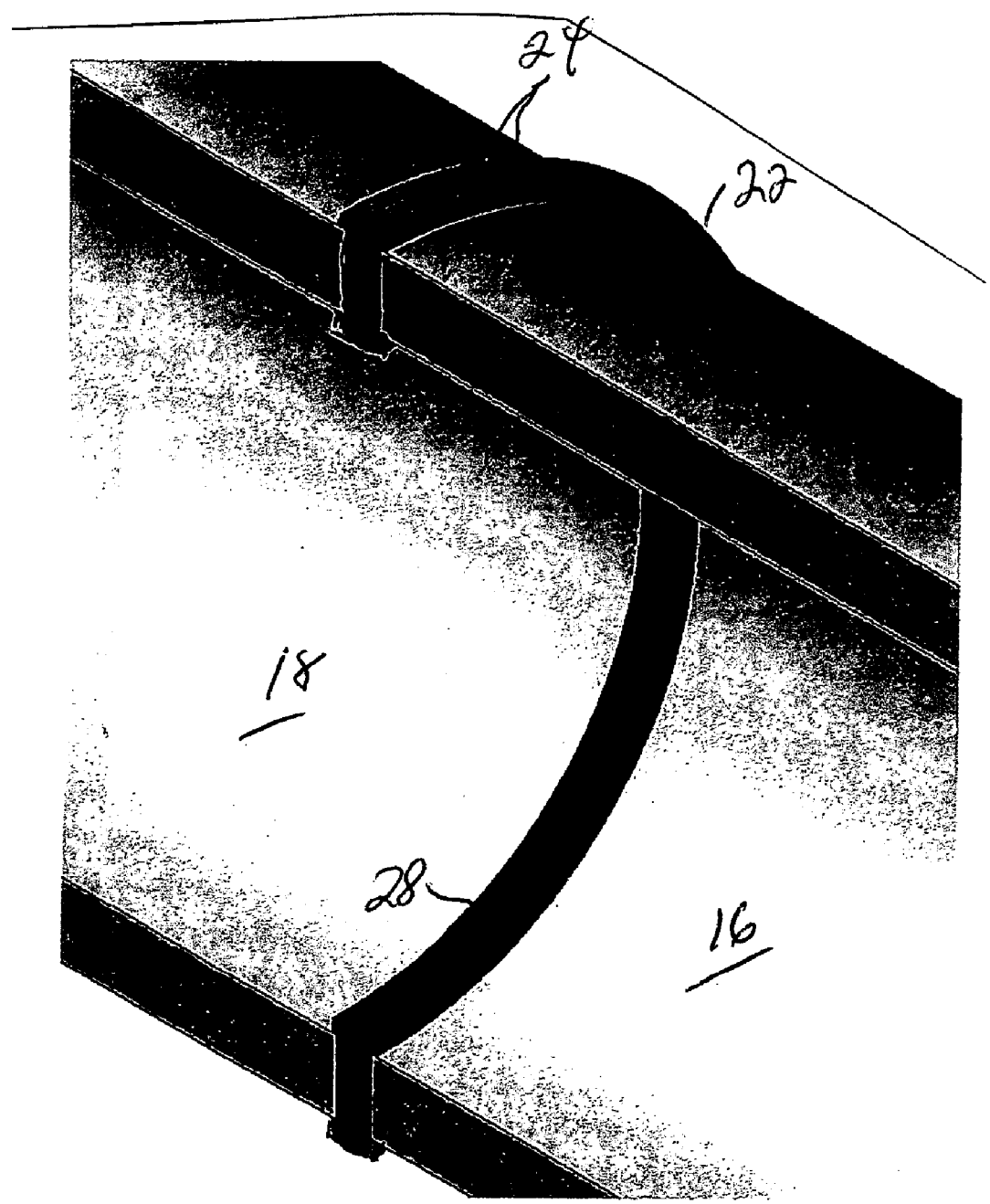
FIG. 8 is a cut away pipe section showing the replacement pipe section connected to the remaining pipe section by an combustible insert.
Figure 9:
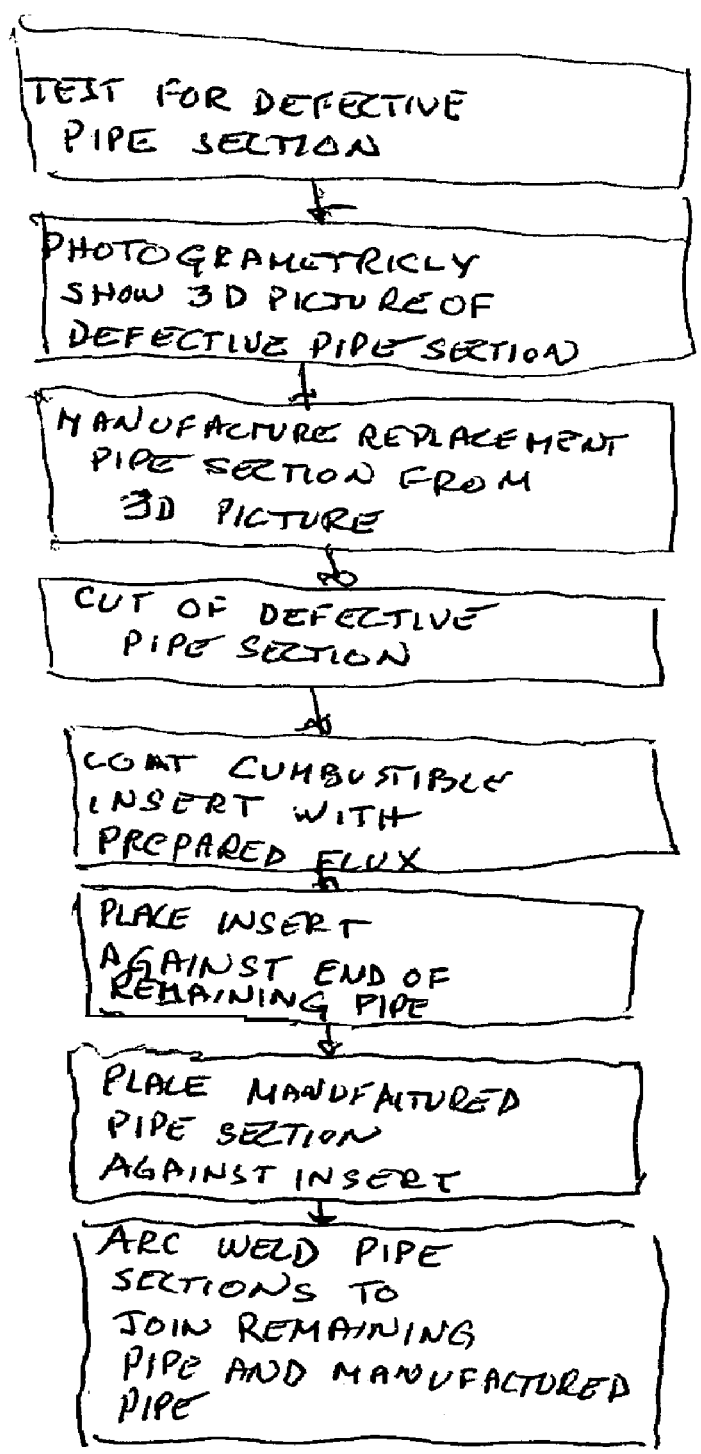
FIG. 9 is a flow sheet showing the process steps of the present invention.

The consumable insert (20) is formed to have a circular doughnut shape best seen in FIG. 7. As seen in cross-section A-A in FIG. 5, it has a top T section (22) with a pair of grooves (24) for retaining a pool of flux. The leg (26) of the insert (20) is made to have a length L equal to the outside diameter of the pipes (16, 18) to allow the top T section to overlap the outside area of the pipes and a bottom T section (28) to overlay the inside area of the pipes as is best seen in the cross section of the pipes as is best seen in the cross section of the pipes in FIG. 8 while the entire insert (20) could be coated with the flux solution it is most important to coat the top T section 22 since the welding will be from the outside of the pipes (16, 18).

In an alternate embodiment of the insert (20) seen in FIG. 6, a flat strip of consumable insert material (30) may be glued to the top T-section (22) to preserve the flux therein and to prevent it from being scratched or peeled off.

The pipes (16, 18) are now welded together using GTAW welding from the outside of the pipes which uses a narrow weld head which fits easily between the gaps of the feeder pipes (12) since there is no need for a bulky wire feeder. The welding is done in one pass due to the deep penetration provided by the consumable insert and the flux coated thereon.

The arc welding is done using known automatic voltage control (AVC) methods, which are beneficial in providing the most robust overall system. AVC is a control methodology that uses arc voltage to provide feedback to the welding system, so that the system can maintain a consistent arc length, which is proportional to the arc voltage in a GTAW application that is utilizing a constant current power supply. Consistent arc length will assist in provided consistent welding penetration profiles.

Certain well-known details of the equipment used herein are deleted for the sake of conciseness and readability, as are obvious modifications to this methodology. As an example, the powder flux could be incorporated into the consumable insert material while the shape of the insert is being formed.

It will be understood that all such are fully intended to fall within the scope of the following claims.

We claim:

1. A consumable insert for arc welding a pair of connecting pipes in a narrow space comprising:
    a vertical section having a length substantially equal to the thickness of said pair of pipes;
    a top section formed at one end of said vertical section having an end at the outside diameter of said pipes and a pair of grooves for retaining flux;
    a bottom section formed at the opposite end of said vertical section having an end at the inside diameter of said pipes and;
    wherein said consumable insert is T-shaped.

2. A T-shaped consumable insert for arc welding a pair of connecting pipes in a narrow space comprising:
    a straight vertical section having a length substantially equal to the thickness of said pair of pipes;
    a top section extending over one end of said straight vertical section having a length which will overlap the outside diameter of said pipes and wherein said top section has a pair of groves for retaining a flux solution therein; and
    a bottom section extending over the opposite end of said vertical section having a length shorter then said top section which will overlap the inside diameter of said pipes.

3. A T-shaped consumable insert as set forth in claim 2 including a flux material coating over said insert.

4. A T-shaped consumable insert as set forth in claim 3 wherein said flux material coating comprises a powdered flux dissolved in an alcohol flux solution.

5. A T-shaped consumable insert as set forth in claim 4 wherein said flux solution includes an adhesive material for adhering said flux material to said insert.

6. A T-shaped consumable insert as set forth in claim 2 wherein said grooves have a flux solution contained therein and further including a consumable material cover over said pair of grooves to retain said flux solution therein.

7. A T-shaped consumable insert as set forth in claim 2 including a powdered flux material contained therein.

* * * * *